(12) United States Patent  
Hosotani

(10) Patent No.: US 11,916,484 B2  
(45) Date of Patent: Feb. 27, 2024

(54) MULTIPHASE DC-DC POWER CONVERTER

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 17/470,833

(22) Filed: Sep. 9, 2021

(65) Prior Publication Data

US 2021/0408914 A1    Dec. 30, 2021

Related U.S. Application Data

(63) Continuation of application No. PCT/JP2019/047983, filed on Dec. 9, 2019.

(30) Foreign Application Priority Data

Mar. 14, 2019  (JP) ................................ 2019-046656

(51) Int. Cl.
*H02M 3/158* (2006.01)
*H02M 1/00* (2006.01)

(52) U.S. Cl.
CPC ....... *H02M 3/1586* (2021.05); *H02M 1/0025* (2021.05); *H02M 1/0009* (2021.05)

(58) Field of Classification Search
CPC . H02M 3/1584; H02M 3/1586; H02M 1/0025
See application file for complete search history.

(56) References Cited

U.S. PATENT DOCUMENTS

| 6,215,290 B1* | 4/2001 | Yang | H02M 3/1584 323/290 |
| 2006/0212138 A1* | 9/2006 | Zhang | H02M 3/1584 713/300 |

(Continued)

FOREIGN PATENT DOCUMENTS

| JP | 2000-227808 A | 8/2000 |
| JP | 2011-147269 A | 7/2011 |

(Continued)

OTHER PUBLICATIONS

International Search Report issued in PCT/JP2019/047983; dated Jan. 7, 2020.

(Continued)

*Primary Examiner* — Alex Torres-Rivera
(74) *Attorney, Agent, or Firm* — Studebaker & Brackett PC

(57) ABSTRACT

Each of a plurality of power conversion units includes an inductor, a switching circuit, and an individual analog controller. An MPU is capable of performing programmable arithmetic processing and outputs oscillation control signals to the plurality of power conversion circuits. Output parts of the plurality of power conversion units are connected to a common output terminal in a parallel manner, and the common output terminal is connected to a load. The individual analog controller is formed of an analog electronic circuit and includes a feedback signal generating part and a driving part. The feedback signal generating part detects the state of the output part of the power conversion unit and generates a feedback signal to be fed back to the power conversion unit. The driving part drives a switching element of the switching circuit.

21 Claims, 11 Drawing Sheets

(56) References Cited

U.S. PATENT DOCUMENTS

| | | | | |
|---|---|---|---|---|
| 2012/0086416 A1* | 4/2012 | Kudo | ............... | H02M 3/1584 |
| | | | | 323/265 |
| 2017/0063239 A1* | 3/2017 | Wu | ............... | H02M 3/1584 |
| 2017/0237349 A1* | 8/2017 | Labib | ............... | H02M 3/158 |
| | | | | 323/271 |
| 2020/0389092 A1* | 12/2020 | Zhan | ............... | H02M 3/1584 |

FOREIGN PATENT DOCUMENTS

| | | |
|---|---|---|
| JP | 2012-080744 A | 4/2012 |
| JP | 2013-094058 A | 5/2013 |
| JP | 2017-135812 A | 8/2017 |

OTHER PUBLICATIONS

International Preliminary Report on Patentability and Written Opinion issued in PCT/JP2019/047983; dated Aug. 25, 2021.

* cited by examiner

MULTIPHASE DC-DC POWER CONVERTER

CROSS-REFERENCE TO RELATED APPLICATIONS

This application claims benefit of priority to International Patent Application No. PCT/JP2019/047983, filed Dec. 9, 2019, and to Japanese Patent Application No. 2019-046656, filed Mar. 14, 2019, the entire contents of each are incorporated herein by reference.

BACKGROUND

Technical Field

The present disclosure relates to a switching power supply device having a configuration in which a plurality of power conversion units each including a switching circuit are connected in parallel to one another.

Background Art

Nowadays, there is a demand for low-voltage, large-current switching power supply devices. As switching power supply devices meeting the demand, switching power supply circuits called multiphase converters are described in, for example, Japanese Unexamined Patent Application Publication No. 2011-147269 and Japanese Unexamined Patent Application Publication No. 2013-94058.

A multiphase converter includes a plurality of power conversion units. For example, the plurality of power conversion units are connected in parallel to one another. The multiphase converter is capable of supplying a large current by outputting output currents of all the plurality of power conversion units together. Furthermore, in the multiphase converter, phases of switching frequencies of the plurality of power conversion units are shifted from one another so that an apparent operating frequency can be increased. Thus, the size of an output smoothing circuit can be reduced, and a stable output voltage and a stable output current can be achieved.

SUMMARY

The state of a load to which a switching power supply device is connected changes with time according to an operation of a load circuit or the like, and load current and power consumption vary with time. In this case, output voltage needs to be unaffected by an abrupt change in the load current and have a stable output. To achieve a stable output voltage, it is necessary to detect output voltages of power conversion circuits, feed the detected output voltages back to a control circuit that controls switching operations, and perform a negative feedback control operation such that a constant output voltage can be obtained.

However, in the case where the control circuit that controls switching operations is implemented by a digital electronic circuit, the digital electronic circuit requires time for arithmetic processing, and it is difficult to achieve a high-speed load response to an abrupt change in load current and control output voltage to be a stable, constant value. Furthermore, since the power conversion circuits are analog electronic circuits, a large number of analog-to-digital converters are required as interfaces between the analog power conversion circuits and digital power conversion circuits. Thus, the control circuit becomes large-scale and complex, resulting in a larger size and an extremely high cost. In contrast, in the case where the control circuit that controls switching operations is implemented by an analog electronic circuit, analog control circuits whose number corresponds to the number of power conversion units are required. Thus, the control circuit becomes large-scale and complex, resulting in a larger size and an extremely high cost.

Thus, the present disclosure provides a system switching power supply device that is capable of achieving both common arithmetic control for controlling a plurality of power conversion circuits and a high-speed load response of output voltage.

A switching power supply device according to the present disclosure includes a plurality of power conversion units, a common control unit, and a common output terminal.

The plurality of power conversion units each include an inductor, a switching circuit, and an individual analog controller. The common control unit is capable of performing programmable arithmetic processing and outputs oscillation control signals to the plurality of power conversion units. Output parts of the plurality of power conversion units are connected to the common output terminal in a parallel manner, and the common output terminal is connected to a load. The individual analog controller is formed of an analog electronic circuit and includes a feedback signal generating part and a driving part. The feedback signal generating part detects a state of the output part of the power conversion unit and generates a feedback signal to be fed back to the power conversion unit. The driving part drives a switching element of the switching circuit.

With the configuration described above, an analog electronic circuit is used as a circuit part that requires a high-speed responsiveness, and a digital electronic circuit is used as a circuit part that requires programmable processing.

According to the present disclosure, an increase in the efficiency, a decrease in the size, and a reduction in the noise of a system switching power supply device that includes a plurality of power conversion units and is capable of performing both digital control for performing common arithmetic control in which centralized control of the entire operation of the plurality of power conversion units is performed and analog control for achieving a high-speed load response of output voltage, can be achieved.

DETAILED DESCRIPTION

First Embodiment

Figure 1:
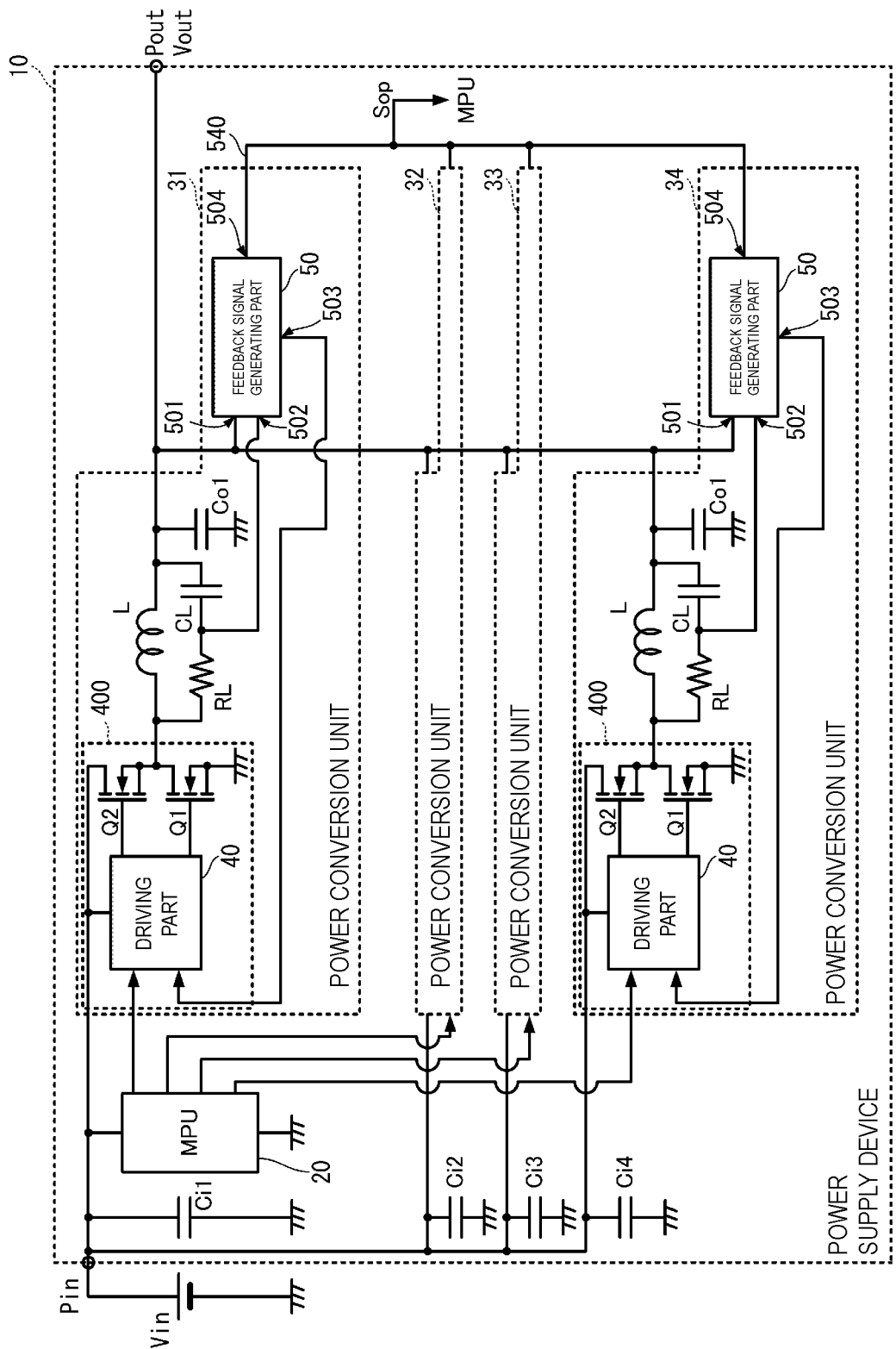
FIG. 1 is a circuit block diagram of a switching power supply device according to a first embodiment.

A switching power supply device according to a first embodiment of the present disclosure will be described with reference to drawings. FIG. 1 is a circuit block diagram of a switching power supply device 10 according to the first embodiment.

As illustrated in FIG. 1, the switching power supply device 10 includes an MPU 20, a power conversion unit 31, a power conversion unit 32, a power conversion unit 33, and a power conversion unit 34. In this embodiment, the number of power conversion units is four. However, the configuration of this embodiment can be applied to the present disclosure as long as a plurality of power conversion units are provided. The switching power supply device 10 also includes an input terminal Pin and an output terminal Pout. The switching power supply device 10 corresponds to a "system switching power supply device" according to the present disclosure, the output terminal Pout corresponds to a "common output terminal" in the present disclosure, and the voltage of the output terminal Pout corresponds to an output voltage Vout. A system switching power supply device represents a power supply device that includes a plurality of power conversion units and properly controls the number of power conversion units that operate and the operating state of the plurality of power conversion units according to the state of a load, unlike, for example, a switching power supply including only one power conversion unit.

The input terminal Pin is connected to an external DC voltage source. A DC input voltage Vin is supplied to the switching power supply device 10 through the input terminal Pin. The output terminal Pout is connected to a load, which is not illustrated in the drawing.

The MPU 20 is connected to the input terminal Pin, and power is supplied to the MPU 20 through the input terminal Pin. This power supply line is connected to a ground reference potential with an input capacitor Ci1 interposed therebetween.

The MPU 20 is a programmable Micro Processing Unit formed of a digital electronic circuit. The MPU 20 is a device that is capable of performing programmable arithmetic processing. The MPU 20 generates a control signal (oscillation control signal) by the programmable arithmetic processing.

The MPU 20 is connected to the power conversion unit 31, the power conversion unit 32, the power conversion unit 33, and the power conversion unit 34. The MPU 20 outputs a control signal to each of the power conversion unit 31, the power conversion unit 32, the power conversion unit 33, and the power conversion unit 34.

For example, the MPU 20 outputs to a power conversion unit that is operating (a power conversion unit that is enabled to operate), out of the plurality of power conversion units, a control signal corresponding to the power conversion unit, and does not output a control signal to a power conversion unit that is not operating (a power conversion unit that is disabled to operate).

A control signal includes an oscillation signal having a switching frequency of a corresponding power conversion unit. There is a phase difference among oscillation signals of control signals. The phase difference is set according to the number of operating power conversion units. Accordingly, the MPU 20 causes the switching power supply device 10 to operate as a multiphase converter.

The MPU 20 determines, in accordance with an operating number signal Sop from a terminal 504, the number of operating power conversion units. The terminal 504 of the power conversion unit 31, the terminal 504 of the power conversion unit 32, the terminal 504 of the power conversion unit 33, and the terminal 504 of the power conversion unit 34 are connected to a common node 540, and the common node 540 is connected to the MPU 20. Furthermore, the MPU 20 determines a phase difference according to the number of operating power conversion units, and sets an oscillation signal to an operating power conversion unit.

The power conversion unit 31, the power conversion unit 32, the power conversion unit 33, and the power conversion unit 34 are connected to the input terminal Pin, and power is supplied to the power conversion unit 31, the power conversion unit 32, the power conversion unit 33, and the power conversion unit 34 through the input terminal Pin. A power supply line for the power conversion unit 31 is connected to the ground reference potential with the input capacitor Ci1 interposed therebetween. A power supply line for the power conversion unit 32 is connected to the ground reference potential with an input capacitor Ci2 interposed therebetween. A power supply line for the power conversion unit 33 is connected to the ground reference potential with an input capacitor Ci3 interposed therebetween. A power supply line for the power conversion unit 34 is connected to the ground reference potential with an input capacitor Ci4 interposed therebetween.

An output end of the power conversion unit 31, an output end of the power conversion unit 32, an output end of the power conversion unit 33, and an output end of the power conversion unit 34 are connected to the output terminal Pout.

The power conversion unit 31, the power conversion unit 32, the power conversion unit 33, and the power conversion unit 34 have the same circuit configuration. Hence, a specific circuit configuration of only the power conversion unit 31 will be described below.

As illustrated in FIG. 1, the power conversion unit 31 includes an inductor L, an output capacitor Co1, a resistor RL, a capacitor CL, a PWM control IC 400, and a feedback signal generating part 50.

A circuit including a switching element Q1 and a switching element Q2 corresponds to a "switching circuit" in the present disclosure. The PWM control IC 400 includes a driving part 40, the switching element Q1, and the switching element Q2. The PWM control IC 400 includes FETs that are integrated together. That is, the PWM control IC 400 is an analog IC. The PWM control IC 400 corresponds to a "PWM control IC including FETs" and a "pulse width modulation control IC".

The PWM control IC 400 is connected to the input terminal Pin, and power is supplied to the PWM control IC 400 through the input terminal Pin.

A control signal is input to the driving part 40 from the MPU 20. A composite feedback signal derived from a voltage feedback signal and a current feedback signal is input to the driving part 40. The driving part 40 generates a switching control signal based on PWM (pulse width modulation) control from the control signal and the composite feedback signal for the switching element Q1 and the switching element Q2.

The gate of the switching element Q2 is connected to the driving part 40, the drain of the switching element Q2 is connected to the input terminal Pin, and the source of the switching element Q2 is connected to the drain of the switching element Q1. The gate of the switching element Q1 is connected to the driving part 40, the source of the switching element Q1 is connected to the ground reference potential. The circuit including the switching element Q1 and the switching element Q2 corresponds to a "switching circuit" in the present disclosure.

A switching control signal for the switching element Q2 is input to the gate of the switching element Q2 from the driving part 40. A switching control signal for the switching element Q1 is input to the gate of the switching element Q1 from the driving part 40.

One end of the inductor L is connected to a connection point of the source of the switching element Q2 and the drain of the switching element Q1.

The other end of the inductor L is connected to the output terminal Pout. The other end of the inductor L is connected to the ground reference potential with the output capacitor Co1 interposed therebetween.

(Detection Circuit for Inductor Current iL)

A series circuit including the resistor RL and the capacitor CL is connected in parallel to the inductor L. This circuit corresponds to an "inductor current detection circuit" in the present disclosure. The resistor RL corresponds to a "detection resistor" having an "AC resistance" in the present disclosure, and the capacitor CL corresponds to a "detection capacitor" in the present disclosure. The inductance of the inductor L, the resistance of an equivalent series resistor Rs of the inductor L, the resistance of the resistor RL, and the capacitance of the capacitor CL have a specific relationship, so that current flowing in the inductor L can be detected without loss.

Figure 2:
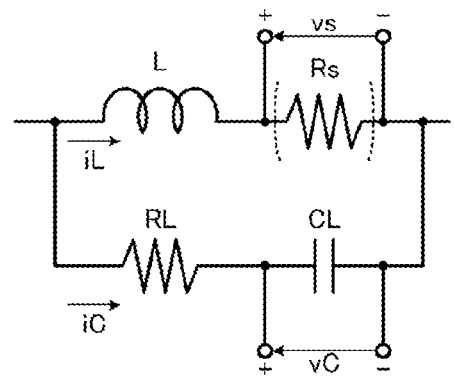
FIG. 2 is an equivalent circuit diagram of a measurement circuit for inductor current.

Specifically, current in the inductor L (inductor current iL) can be detected without loss in accordance with the principle explained below. FIG. 2 is an equivalent circuit diagram of a measurement circuit for inductor current.

The inductor L has the equivalent series resistor Rs. Thus, the series circuit including the resistor RL and the capacitor CL may be regarded as being connected in parallel to the series circuit including the inductor L and the equivalent series resistor Rs.

The voltage across the capacitor CL is represented by vC. In this case, a side of the capacitor CL that is connected to the resistor RL is positive. The voltage across the equivalent series resistor Rs is represented by vs. In this case, a side of the equivalent series resistor Rs that is connected to the inductor L is positive.

In this case, vs can be expressed as a function of time t by Equation (1), where the inductor current is represented by iL(t) as a function of time t and voltage applied to this circuit is represented by E.

$$vs(t)=iL(t)\cdot Rs=(E/L)\cdot t\cdot Rs \qquad \text{(Equation 1)}$$

Meanwhile, vC can be expressed as a function of time t in the vicinity of t=0 by Equation 2.

$$vc(t)=(E/(CL\cdot RL))\cdot t \qquad \text{(Equation 2)}$$

The voltage vs across the equivalent series resistor Rs is equal to a voltage drop in the inductor current iL(t). Thus, by making the voltage vs(t) across the equivalent series resistor Rs equal to the voltage vc(t) across the capacitor CL, the inductor current iL(t) can be detected without loss by the voltage vc(t) across the capacitor CL that varies with time. That is, by satisfying Equation 3, the inductor current iL(t) can be detected without loss by the voltage vc(t) across the capacitor CL.

$$vs(t)=vc(t) \qquad \text{(Equation 3)}$$

By substituting (Equation 1) and (Equation 2) into (Equation 3), the equation provided below can be obtained.

$$Rs/L=1/(CL\cdot RL) \qquad \text{(Equation 4)}$$

Thus, by setting the capacitance of the capacitor CL and the resistance of the resistor RL, that is, the time constant of a CR circuit including the capacitor CL and the resistor RL (CR time constant), to satisfy (Equation 4) with respect to the inductance of the inductor L and the resistance of the equivalent series resistor Rs of the inductor L, the inductor current iL(t) that varies with time can be detected without loss.

(Feedback Signal Generating Part 50)

As illustrated in FIG. 1, the feedback signal generating part 50 includes a terminal 501, a terminal 502 a terminal 503, and the terminal 504. The terminal 501 is connected to the output terminal Pout, that is, a parallel connection part of the output end of the power conversion unit 31, the output end of the power conversion unit 32, the output end of the power conversion unit 33, and the output end of the power conversion unit 34. The terminal 502 is connected to a connection point of the resistor RL and the capacitor CL. The terminal 503 is connected to the driving part 40 of the PWM control IC 400.

The terminal 504 is connected in parallel to a terminal 504 of a feedback signal generating part 50 of another power conversion unit. That is, the terminal 504 of the feedback signal generating part 50 of each of the power conversion unit 31, the power conversion unit 32, the power conversion unit 33, and the power conversion unit 34 is connected to the common node 540. The common node 540 is connected to the MPU 20.

Figure 3:
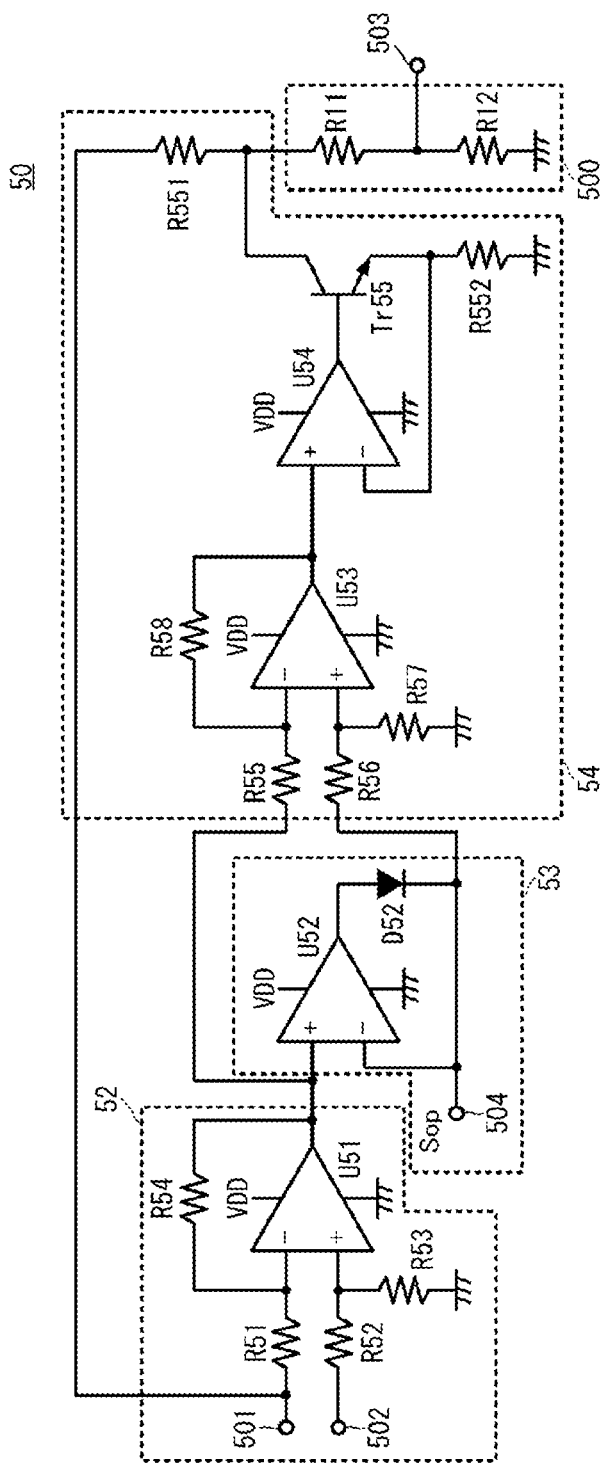
FIG. 3 is a circuit diagram of a feedback signal generating part in the first embodiment.

In terms of functionality, the feedback signal generating part 50 has a configuration described below. FIG. 3 is a circuit diagram of the feedback signal generating part 50 in the first embodiment. As illustrated in FIG. 3, the feedback signal generating part 50 includes an individual current signal generating part 52, a common signal generating part 53, an individual current feedback signal generating part 54, and an individual voltage feedback signal generating part 500.

(Individual Current Signal Generating Part 52)

As illustrated in FIG. 3, the individual current signal generating part 52 includes an amplifier U51, a resistor R51, a resistor R52, a resistor R53, and a resistor R54.

An inverting input terminal of the amplifier U51 is connected to the terminal 501 with the resistor R51 interposed therebetween. A non-inverting input terminal of the amplifier U51 is connected to the terminal 502 with the resistor R52 interposed therebetween. The resistance of the resistor R51 is equal to the resistance of the resistor R52. The resistor R53 is connected between the non-inverting input terminal and the ground reference potential. An output terminal of the amplifier U51 is connected to the inverting input terminal of the amplifier U51 with the resistor R54 interposed therebetween. The resistance of the resistor R53 is equal to the resistance of the resistor R54. Drive power VDD is supplied to the amplifier U51. With this circuit configuration, the individual current signal generating part 52 implements a differential amplification circuit.

The terminal 501 is connected to the output terminal Pout, and the terminal 502 is connected to the connection point of the capacitor CL and the resistor RL. Accordingly, a potential difference corresponding to the inductor current iL is generated between the non-inverting input terminal and the inverting input terminal of the amplifier U51. Thus, a signal based on the inductor current iL is amplified at a predetermined amplification factor and output as an individual current signal from the output terminal of the amplifier U51, that is, from the output terminal of the individual current signal generating part 52.

(Common Signal Generating Part 53)

As illustrated in FIG. 3, the common signal generating part 53 includes an amplifier U52 and a diode D52. A non-inverting input terminal of the amplifier U52 is connected to the output terminal of the amplifier U51. An output terminal of the amplifier U52 is connected to an inverting input terminal of the amplifier U52 with the diode D52 interposed therebetween. The anode of the diode D52 is connected to the output terminal, and the cathode of the diode D52 is connected to the inverting input terminal. The inverting input terminal is connected to the terminal 504, that is, the common node 540. Drive power VDD is supplied to the amplifier U52.

With this circuit configuration, the common signal generating part 53 implements a circuit holding the maximum value of individual current signals for the plurality of power conversion units 31 to 34. The signal having the maximum value of the individual current signals corresponds to a "common bus signal" in the present disclosure. The "common bus signal" serves as an "operating number signal Sop".

(Individual Current Feedback Signal Generating Part 54)

The individual current feedback signal generating part 54 includes an amplifier U53, an amplifier U54, a transistor Tr55, a resistor R55, a resistor R56, a resistor R57, a resistor R58, a resistor R551, and a resistor R552.

An inverting input terminal of the amplifier U53 is connected to the output terminal of the amplifier U51 with the resistor R55 interposed therebetween. A non-inverting input terminal of the amplifier U53 is connected to the cathode of the diode D52 and the terminal 504 with the resistor R56 interposed therebetween. The resistance of the resistor R55 is equal to the resistance of the resistor R56. The resistor R57 is connected between the non-inverting input terminal of the amplifier U53 and the ground reference potential. An output terminal of the amplifier U53 is connected to the inverting input terminal of the amplifier U53 with the resistor R58 interposed therebetween. The resistance of the resistor R57 is equal to the resistance of the resistor R58. Drive power VDD is supplied to the amplifier U53.

A non-inverting input terminal of the amplifier U54 is connected to the output terminal of the amplifier U53. An output terminal of the amplifier U54 is connected to the base of the transistor Tr55, which is of an NPN type. The collector of the transistor Tr55 is connected to the terminal 501 with the resistor R551 interposed therebetween. The emitter of the transistor Tr55 is connected to the ground reference potential with the resistor R552 interposed therebetween. The emitter of the transistor Tr55 is also connected to an inverting input terminal of the amplifier U54. Furthermore, a connection point of the collector of the transistor Tr55 and the resistor R551 is connected to the ground reference potential with a series circuit including a resistor R11 and a resistor R12 interposed therebetween.

A connection point of the resistor R11 and the resistor R12 is connected to the terminal 503. The series circuit including the resistor R11 and the resistor R12 forms the individual voltage feedback signal generating part 500.

An individual current signal is input to the inverting input terminal of the amplifier U53, and a common bus signal is input to the non-inverting input terminal of the amplifier U53. Accordingly, a potential difference between the common bus signal and the individual current signal is generated between the non-inverting input terminal and the inverting input terminal of the amplifier U53. Thus, a signal based on the potential difference between the common bus signal and the individual current signal is amplified at a predetermined amplification factor and output to the amplifier U54 from the output terminal of the amplifier U53.

A circuit including the amplifier U54, the transistor Tr55, and the resistor R552 form a voltage-current converting circuit. Specifically, in this circuit, when a differential signal (differential voltage) is applied to the non-inverting input terminal of the amplifier U54, a differential signal (differential current Iadj) flows between the collector and the emitter of the transistor Tr55. This differential current corresponds to an individual current feedback signal.

Due to the differential current Iadj flowing, the voltage of the connection point (collector of the transistor Tr55) between the resistor R551 and the resistor R11 becomes Vout−(Rr551×Iadj), where Rr551 represents the resistance of the resistor R551.

As a result, voltages obtained by dividing the voltage represented by Vout−(Rr551×Iadj) by the resistor R11 and the resistor R12 are output to the terminal 503. That is, the difference between an individual current amplification signal and the operating number signal Sop (maximum value holding signal) and a voltage corresponding to the output voltage Vout are output to the terminal 503. In other words, the individual current feedback signal and the individual voltage feedback signal, which is determined on the basis of the resistances of the resistor R551, the resistor R11, and the resistor R12 and the output voltage Vout, are combined together and are output as an individual feedback signal to the terminal 503. The individual feedback signal is fed back to the driving part 40. The driving part 40 performs PWM control on the basis of the individual feedback signal, and outputs a switching control signal to the switching element Q1 and the switching element Q2.

Accordingly, a stable output voltage can be achieved. As described above, the feedback signal generating part 50 is formed of an analog electronic circuit. Thus, the feedback signal generating part 50 is capable of outputting an individual current feedback signal and an individual voltage feedback signal that rapidly respond to variations in the output voltage. Thus, the switching power supply device 10 is able to achieve a stable output voltage and rapidly respond to variations in the output voltage.

Consequently, the switching power supply device 10 is capable of performing both digital control for performing common arithmetic control in which centralized control of the entire operation of a plurality of power conversion units is performed and analog control for achieving a high-speed load response of output voltage, and an increase in the efficiency, a decrease in the size, and a reduction in the noise of a system switching power supply device including the plurality of power conversion units can be achieved.

Furthermore, as described above, with the use of a digital electronic circuit for common arithmetic control and the use of an analog electronic circuit for an individual power conversion unit, only by changing the number of power conversion units in terms of hardware and only by changing firmware for common arithmetic control in terms of software, a scalable system switching power supply device with scalability that is able to support a wide-ranging lineup of system switching power supply devices dealing with various supply currents and flexibly support specifications for supply currents, can be achieved.

Furthermore, in the switching power supply device 10, each of the power conversion unit 31, the power conversion unit 32, the power conversion unit 33, and the power conversion unit 34 performs PWM control using an individual feedback signal. Thus, the switching power supply device 10 is able to obtain more accurate and stable output characteristics.

(Configuration Regarding Switching Control of Operating Number)

The operating number signal Sop, which is a common bus signal, is input to the MPU 20, as described above. The MPU 20 determines, in accordance with the operating number signal Sop, the number of power conversion units that are to operate, and generates a control signal. As described above, the MPU 20 is a programmable Micro Processing Unit and implements functions illustrated in FIG. 4. That is, the MPU 20 implements, as a digital electronic circuit, the functions illustrated in FIG. 4.

Figure 4:
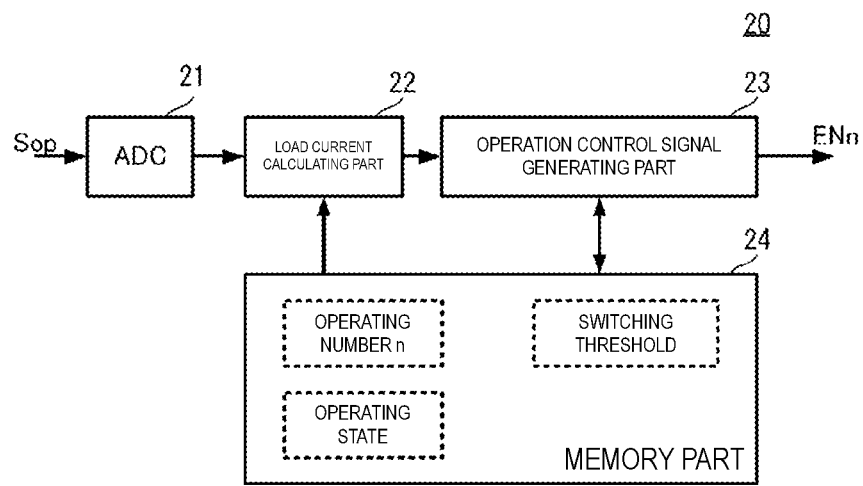
FIG. 4 is a functional block diagram of an MPU in the first embodiment.

FIG. 4 is a functional block diagram of the MPU 20 in the first embodiment. As illustrated in FIG. 4, the MPU 20 includes an ADC 21, a load current calculating part 22, an operation control signal generating part 23, and a memory part 24.

An operating number, an operating state, and a switching threshold are stored in the memory part 24. That is, the MPU 20 holds an operating number, an operating state, and a switching threshold. An operating number n represents the number of power conversion units that are currently operating. An operating state includes the phase of a control signal (oscillation signal) supplied to an operating power conversion unit, for example, in the case where a plurality of power conversion units are operating, phases of control signals (oscillation signals) output to the plurality of power conversion units or a phase difference between the control signals (oscillation signals). A switching threshold represents a load current value as a criterion for the determination of switching of an operating number.

The ADC 21 is an analog-to-digital conversion circuit and converts an operating number signal Sop, which is an analog signal, into a digital signal.

The load current calculating part 22 calculates a load current value from the operating number signal Sop. Specifically, the load current calculating part 22 reads the operating number n from the memory part 24. The load current calculating part 22 calculates a load current value Iz by multiplying the operating number signal Sop by the operating number n. The load current calculating part 22 outputs the load current value Iz to the operation control signal generating part 23.

The operation control signal generating part 23 reads a switching threshold TH from the memory part 24. The operation control signal generating part 23 compares the load current value Iz with the switching threshold TH, and determines the operating number n on the basis of the result of the comparison.

Specifically, the operation control signal generating part 23 determines the operating number n on the basis of a principle described below.

Figure 5:
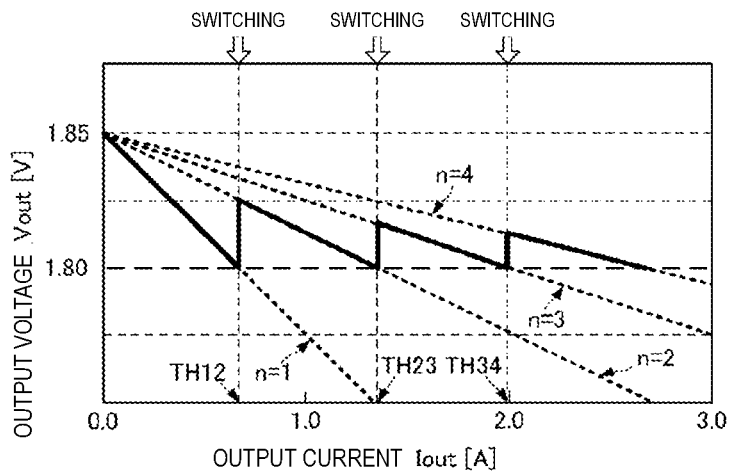
FIG. 5 is a diagram for explaining the concept of switching an operating number.

FIG. 5 is a diagram for explaining the concept of switching of an operating number. FIG. 5 is a graph indicating the relationship between output voltage and output current in a circuit configuration in which a plurality of power conversion units are connected in parallel to one another. The horizontal axis represents the output current, and the vertical axis represents the output voltage.

The output voltage Vout and the output current Iout have a relationship expressed by Equation 5, where the number of operating power conversion units that are connected in parallel to one another is represented by n, the resistance of the power conversion units is represented by r, and the input voltage is represented by Vin.

$$Vout=Vin-(r/n)Iout \quad \text{(Equation 5)}$$

The input voltage Vin is constant. With the relationship mentioned above, output characteristics represented by dotted lines indicated in FIG. 5 can be obtained. As indicated by the dotted lines, as the operating number n becomes larger, a larger output current Iout can be obtained while the amount of decrease in the output voltage Vout being reduced. That is, as the operating number n increases, a larger load current can be obtained with low loss with respect to a stable desired output voltage Vout.

For example, as illustrated in FIG. 5, the input voltage Vin is set to 1.85 [V], and the minimum value of the output voltage is set to 1.80 [V].

The operation control signal generating part 23 uses the output current (load current) Iout at the time when output characteristics for each operating number n reaches 1.80 [V] as the switching threshold. For example, in the example of FIG. 4, a switching threshold TH12 for switching the operating number n from 1 to 2 is set on the basis of the output current Iout at the time when the output voltage Vout reaches 1.80 [V] in the output characteristics for the operating number n=1. In a similar manner, a switching threshold TH23 for switching the operating number n from 2 to 3 is set on the basis of the output current Iout at the time when the output voltage Vout reaches 1.80 [V] in the output characteristics for the operating number n=2. Furthermore, a switching threshold TH34 for switching the operating number n from 3 to 4 is set on the basis of the output current Iout at the time when the output voltage Vout reaches 1.80 [V] in the output characteristics for the operating number n=3.

In the case where the load current value Iz is greater than the switching threshold TH12 when the operating number n is "1", the operation control signal generating part 23 switches the operating number n to "2". In a similar manner, in the case where the load current value Iz is greater than the switching threshold TH23 when the operating number n is "2", the operation control signal generating part 23 switches the operating number n to "3". Furthermore, in a similar manner, in the case where the load current value Iz is greater than the switching threshold TH34 when the operating number n is "3", the operation control signal generating part 23 switches the operating number n to "4". For example, in the case where the load current abruptly changes and the load current value Iz exceeds the switching threshold TH23 when the operating number n is "1", the operation control signal generating part 23 may switch the operating number n from "1" to "3".

The same principle as the above-described principle of increasing the operating number n may be used for a switching threshold for decreasing the operating number n and the principle of decreasing the operating number n.

After determining the operating number n, the operation control signal generating part 23 determines a power conversion unit(s) that are to operate, in accordance with the operating number n. At this time, for example, the operation control signal generating part 23 refers to an operating state read from the memory part 24 and determines a power conversion unit(s) that are to operate.

Specifically, for example, in the case where one power conversion unit, the power conversion unit 31, is operating and the other three power conversion units, the power conversion unit 32, the power conversion unit 33, and the power conversion unit 34, are stopped (not operating), the operating number n is changed to "2". The operation control signal generating part 23 reads, based on the operating state, the fact that the power conversion unit 31 is in an operating state, and performs setting such that any one of the power conversion unit 32, the power conversion unit 33, and the power conversion unit 34 that are not in the operating state is to operate. That is, the power conversion unit 31, which is currently operating, is made to continuously operate without stopping, and any one of the power conversion unit 32, the power conversion unit 33, and the power conversion unit 34, which are not in the operating state, is made to start operating.

The operation control signal generating part 23 generates a control signal including the oscillation signal described above, and outputs the control signal to each of the power conversion units that are to operate after switching of the operating number n. At this time, the operation control signal generating part 23 determines the phase difference among the oscillation signals in accordance with the operating number n.

As described above, with the configuration in this embodiment, the switching power supply device 10 is capable of properly changing the operating number n in accordance with the load current value Iz, while measuring the load current value Iz (output current Iout). Accordingly, the switching power supply device 10 is capable of performing automatic control for outputting a desired output current Iout while maintaining a stable output voltage Vout.

At this time, the determination of the operating number n and the control for switching are performed by the MPU 20, which is formed of a digital electronic circuit. Thus, the configuration of a circuit for determining the operating number n and performing control for switching can be simplified compared to the case where an analog electronic circuit is used. In particular, as the number of power conversion units increases, the effect of simplification increases.

In the explanation provided above, an aspect in which processing is performed in a state in which the MPU 20 is divided into a plurality of functional blocks. However, by performing a process illustrated in FIG. 6 by an arithmetic device that performs digital processing, processing similar to that performed by the MPU 20 can be performed.

Figure 6:
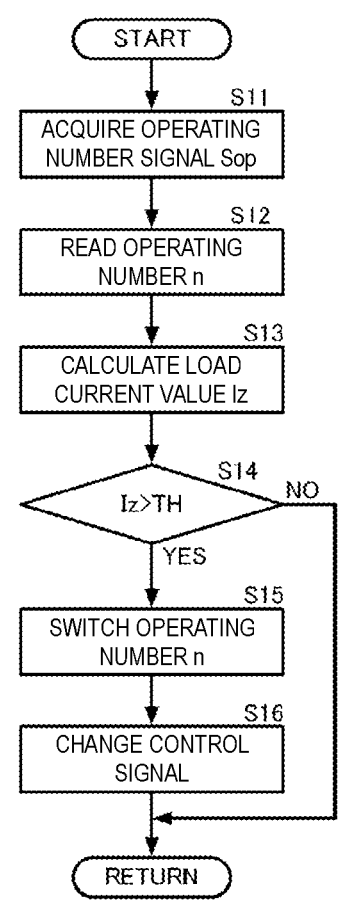
FIG. 6 is a flowchart illustrating a process for switching an operating number.

FIG. 6 is a flowchart illustrating a process for switching an operating number. The specific details of each processing operations have been described above, and detailed explanations will be omitted. Furthermore, FIG. 6 is a flowchart of a process for increasing an operating number.

As illustrated in FIG. 6, the arithmetic device acquires an operating number signal Sop (S11). The arithmetic device reads an operating number n that the arithmetic device holds (S12).

The arithmetic device calculates the load current value Iz on the basis of the operating number signal Sop and the operating number n (S13). In the case where the load current value Iz is greater than a switching threshold TH (S14: YES), the arithmetic device performs switching such that the operating number n is increased (S15). The arithmetic device changes a control signal in accordance with the switched operating number n (S16).

In the case where the load current value Iz is smaller than or equal to the switching threshold TH (S14: NO), the arithmetic device maintains the operating number n and continuously outputs an original control signal.

A process for decreasing the operating number n can be implemented by, for example, performing switching such that the operating number n is decreased in the case where the load current value Iz is smaller than the switching threshold TH.

Second Embodiment

Figure 7:
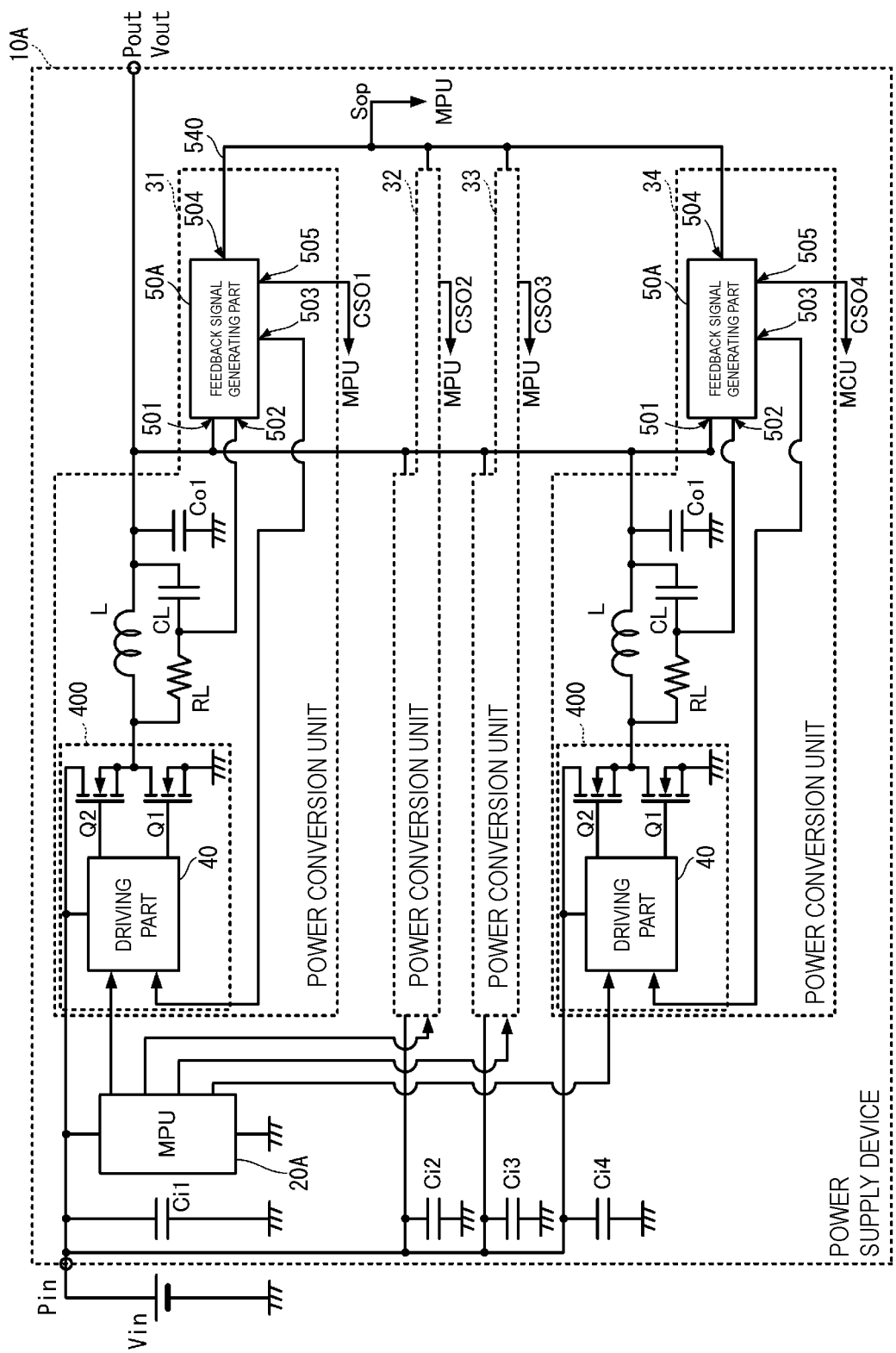
FIG. 7 is a circuit block diagram of a switching power supply device according to a second embodiment.

A switching power supply device according to a second embodiment of the present disclosure will be described with reference to drawings. FIG. 7 is a circuit block diagram of a switching power supply device 10A according to the second embodiment.

As illustrated in FIG. 7, the switching power supply device 10A according to the second embodiment is different from the switching power supply device 10 according to the first embodiment in the configuration of an MPU 20A and a feedback signal generating part 50A. The other configuration features of the switching power supply device 10A are similar to those of the switching power supply device 10, and explanation for those similar parts will be omitted.

The switching power supply device 10A includes the MPU 20A, the power conversion unit 31, the power conversion unit 32, the power conversion unit 33, and the power conversion unit 34. The power conversion unit 31, the power conversion unit 32, the power conversion unit 33, and the power conversion unit 34 each include the feedback signal generating part 50A.

Figure 8:
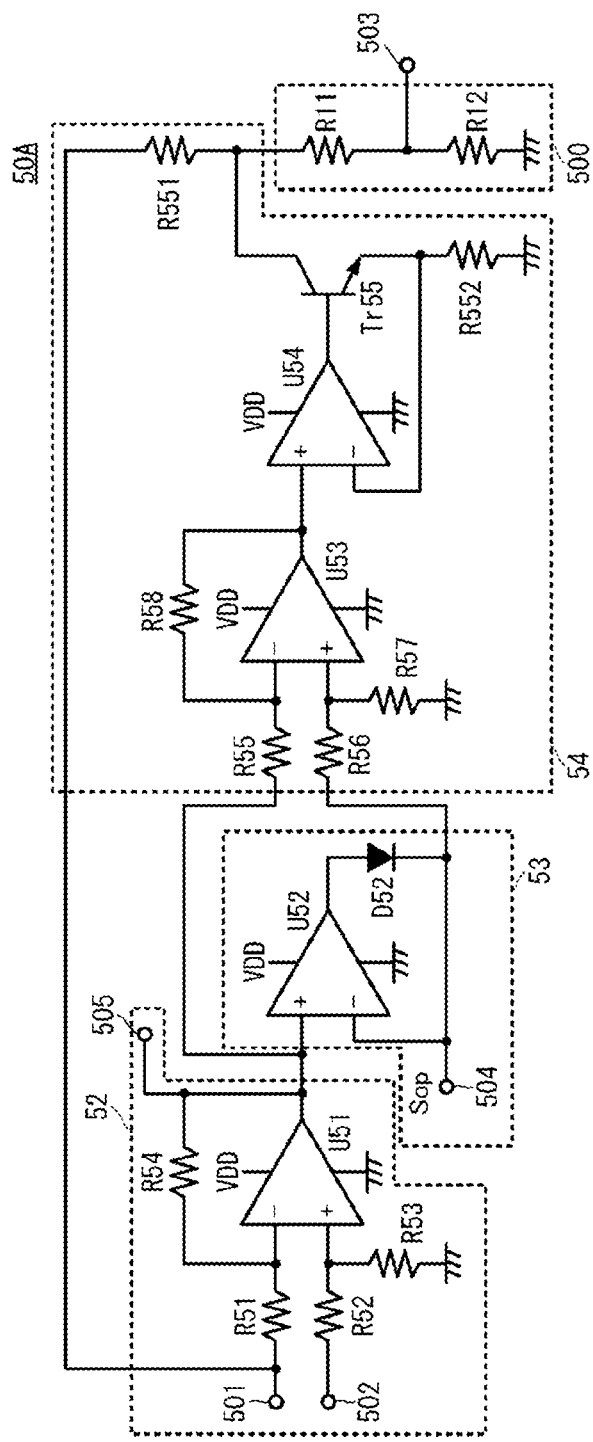
FIG. 8 is a circuit diagram of a feedback signal generating part in the second embodiment.

FIG. 8 is a circuit diagram of a feedback signal generating part in the second embodiment. As illustrated in FIG. 8, the feedback signal generating part 50A is different from the feedback signal generating part 50 in the first embodiment in that a terminal 505 is added. The other configuration features of the feedback signal generating part 50A are similar to those of the feedback signal generating part 50, and explanation for those similar parts will be omitted.

The terminal 505 is connected to the output terminal of the amplifier U51. Accordingly, an individual current signal CSO is output from the terminal 505. Specifically, an individual current signal CSO1 corresponding to the operating state of the power conversion unit 31 is output through the terminal 505 of the feedback signal generating part 50A of the power conversion unit 31. An individual current signal CSO2 corresponding to the operating state of the power conversion unit 32 is output through the terminal 505 of the feedback signal generating part 50A of the power conversion unit 32. An individual current signal CSO3 corresponding to the operating state of the power conversion unit 33 is output through the terminal 505 of the feedback signal generating part 50A of the power conversion unit 33. An individual current signal CSO4 corresponding to the operating state of the power conversion unit 34 is output through the terminal 505 of the feedback signal generating part 50A of the power conversion unit 34.

The power conversion unit 31 outputs the individual current signal CSO1 to the MPU 20A. The power conversion unit 32 outputs the individual current signal CSO2 to the MPU 20A. The power conversion unit 33 outputs the individual current signal CSO3 to the MPU 20A. The power conversion unit 34 outputs the individual current signal CSO4 to the MPU 20A.

Figure 9:
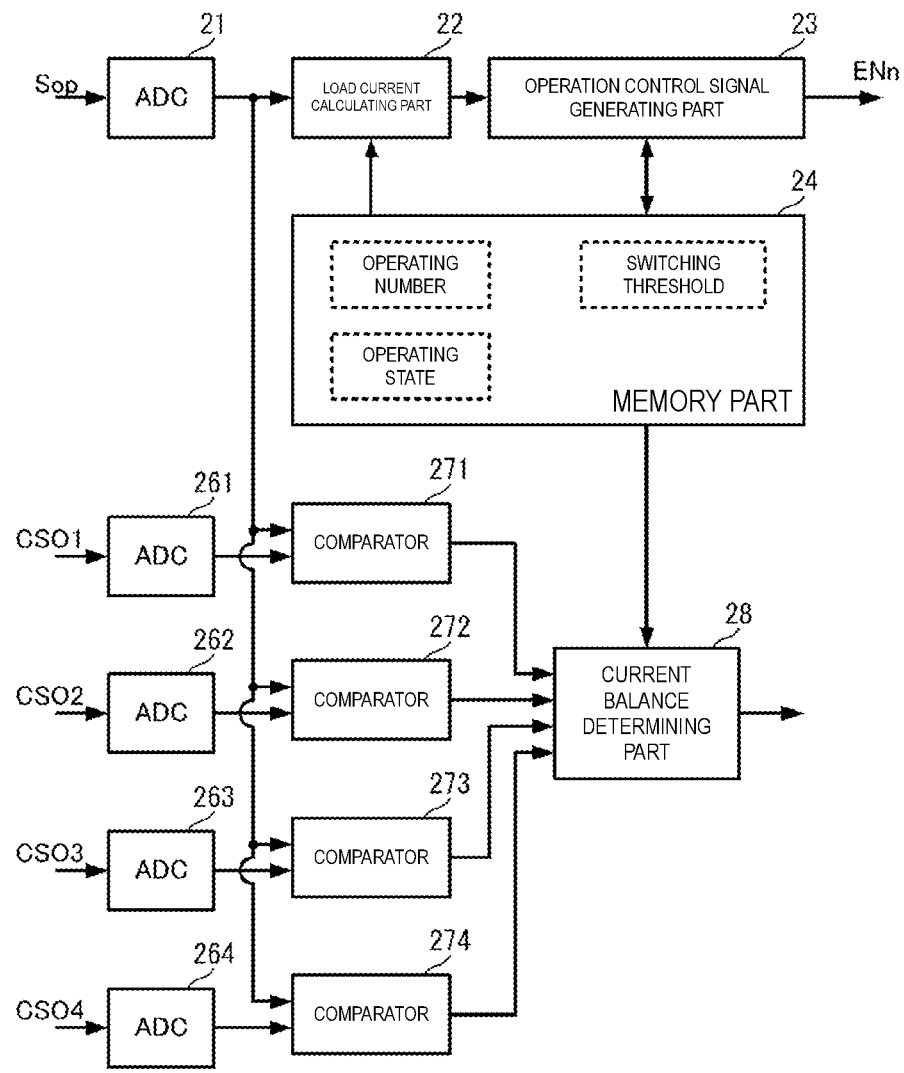
FIG. 9 is a functional block diagram of an MPU in the second embodiment.

FIG. 9 is a functional block diagram of the MPU 20A in the second embodiment. As illustrated in FIG. 9, compared to the MPU 20 in the first embodiment, the MPU 20A includes an ADC 261, an ADC 262, an ADC 263, an ADC 264, a comparator 271, a comparator 272, a comparator 273, a comparator 274, and a current balance determining part 28.

The ADC 261, the ADC 262, the ADC 263, and the ADC 264 are analog-to-digital conversion circuits. The ADC 261 converts the individual current signal CSO1, which is an analog signal, into a digital signal. The ADC 262 converts the individual current signal CS 02, which is an analog signal, into a digital signal. The ADC 263 converts the individual current signal CSO3, which is an analog signal, into a digital signal. The ADC 264 converts the individual current signal CSO4, which is an analog signal, into a digital signal.

The comparator 271 compares the individual current signal CS 01 with the operating number signal Sop and outputs the result of the comparison. The comparator 272 compares the individual current signal CSO2 with the operating number signal Sop and outputs the result of the comparison. The comparator 273 compares the individual current signal CSO3 with the operating number signal Sop and outputs the result of the comparison. The comparator 274 compares the individual current signal CSO4 with the operating number signal Sop and outputs the result of the comparison.

As described above, the operating number signal Sop is a signal indicating the maximum value of individual current signals. Thus, by the processing described above, the comparator 271, the comparator 272, the comparator 273, and the comparator 274 may obtain variations among the individual current signals for the power conversion unit 31, the power conversion unit 32, the power conversion unit 33, and the power conversion unit 34.

The current balance determining part 28 determines the balance among the individual current signals for the power conversion unit 31, the power conversion unit 32, the power conversion unit 33, and the power conversion unit 34, in accordance with the results of the comparison by the comparator 271, the comparator 272, the comparator 273, and the comparator 274. At this time, the current balance determining part 28 reads the operating state from the memory part 24, and determines the balance on the basis of only power conversion units that are operating.

For example, in the case where the result of comparison by the comparator 271 is significantly different from the results of comparisons by the comparator 272, the comparator 273 and the comparator 274, the current balance determining part 28 determines that the balance among the individual current signals for the power conversion unit 31, the power conversion unit 32, the power conversion unit 33, and the power conversion unit 34 is lost. Thus, for example, the current balance determining part 28 determines that there may a failure in the operation of the power conversion unit 31. For example, the current balance determining part 28 generates and outputs an alert signal in accordance with the results of the determination.

With this configuration, the switching power supply device 10A can obtain operational effects similar to those obtained by the switching power supply device 10 and can determine the operating state of a plurality of power conversion units that are operating.

Furthermore, with this configuration, the switching power supply device 10A includes, as a digital electronic circuit, a circuit for determining the balance among individual current signals. Thus, the switching power supply device 10A, which has a simple circuit configuration, is also able to implement a function for determining the output balance among the power conversion units 31 to 34.

Third Embodiment

Figure 10:
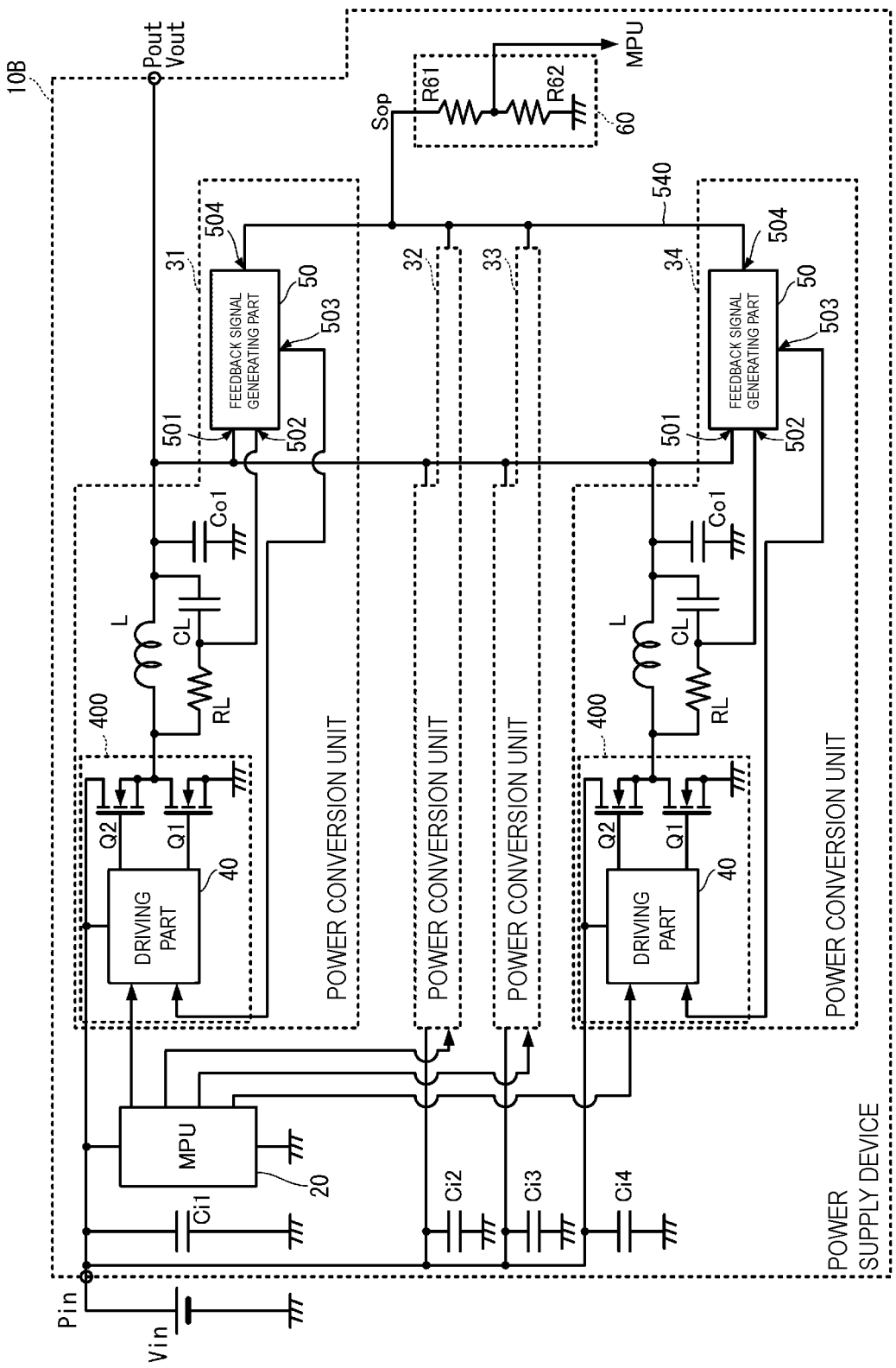
FIG. 10 is a circuit block diagram of a switching power supply device according to a third embodiment.

A switching power supply device according to a third embodiment of the present disclosure will be described with reference to drawings. FIG. 10 is a circuit block diagram of a switching power supply device 10B according to the third embodiment.

As illustrated in FIG. 10, the switching power supply device 10B according to the third embodiment is different from the switching power supply device 10 according to the first embodiment in that a voltage-dividing circuit 60 is provided. The other configuration features of the switching power supply device 10B are similar to those of the switching power supply device 10, and explanation for those similar parts will be omitted.

The voltage-dividing circuit 60 is connected between the common node 540 and the MPU 20. The voltage-dividing circuit 60 includes a resistor R61 and a resistor R62. The resistor R61 and the resistor R62 are connected in series to each other, and this series circuit is connected between the common node 540 and the ground reference potential. A connection point (voltage division point) of the resistor R61 and the resistor R62 is connected to the MPU 20.

The voltage-dividing circuit 60 divides the voltage of the operating number signal Sop and outputs the voltage-divided operating number signal Sop to the MPU 20.

With the configuration described above, the voltage of the operating number signal Sop that is input to the MPU 20 is reduced. Thus, the voltage of the operating number signal Sop can be prevented from exceeding the power supply voltage of the MPU 20. Accordingly, a reliable operation of the MPU 20 described above can be achieved. Furthermore, the voltage of the MPU 20 can be reduced.

Fourth Embodiment

Figure 11:
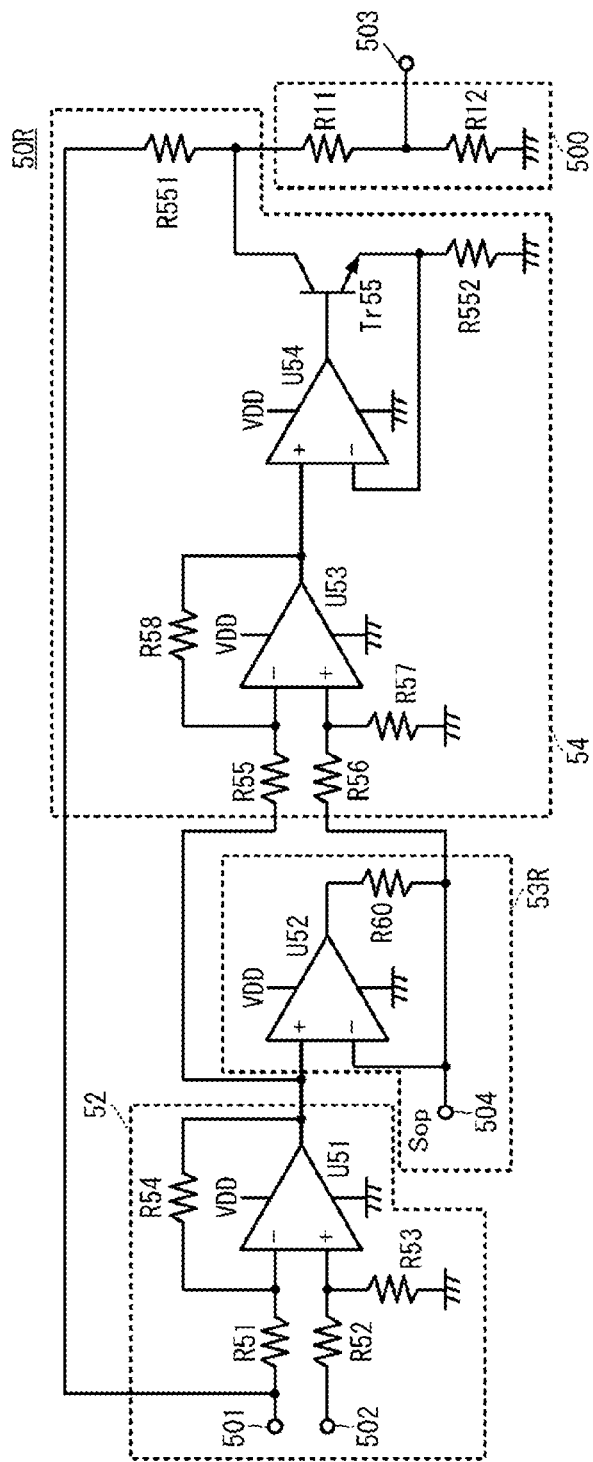
FIG. 11 is a circuit block diagram of a feedback signal generating part of a switching power supply device according to a fourth embodiment.

A switching power supply device according to a fourth embodiment of the present disclosure will be described with reference to drawings. FIG. 11 is a circuit block diagram of a feedback signal generating part 50R in the switching power supply device according to the fourth embodiment.

As illustrated in FIG. 11, the feedback signal generating part 50R of the switching power supply device according to the fourth embodiment is different from the feedback signal generating part 50 of the switching power supply device 10 according to the first embodiment in that a common signal generating part 53R is provided. Other configuration features of the feedback signal generating part 50R are similar to those of the feedback signal generating part 50, and explanation for those similar parts will be omitted.

The common signal generating part 53R includes a resistor R60. The resistor R60 is connected between the output terminal and the inverting input terminal of the amplifier U52. With this configuration, an average value calculation circuit including the amplifier U52 and the resistor R60 is implemented.

The common signal generating part 53R outputs this average value signal as an operating number signal Sop. Accordingly, processing similar to that for the maximum value signal described above can also be achieved by using the average value signal as the operating number signal Sop.

Fifth Embodiment

Figure 12:
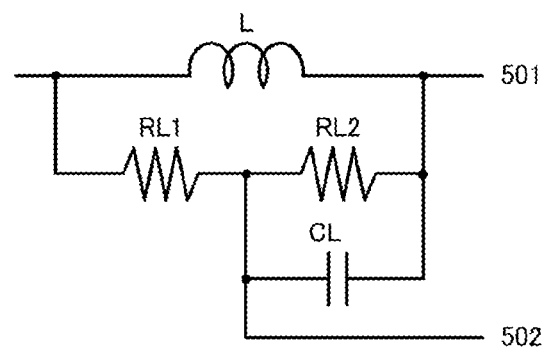
FIG. 12 is a circuit diagram of a detection circuit for inductor current of a switching power supply device according to a fifth embodiment.

A switching power supply device according to a fifth embodiment of the present disclosure will be described with reference to drawings. FIG. 12 is a circuit diagram of a detection circuit for inductor current in the switching power supply device according to the fifth embodiment.

The switching power supply device according to the fifth embodiment is different from the switching power supply device 10 according to the first embodiment in the configuration of the detection circuit for inductor current. The other configuration features of the switching power supply device according to the fifth embodiment are similar to those of the switching power supply device 10, and explanation for those similar parts will be omitted.

As illustrated in FIG. 12, a series circuit including a resistor RL1 and a resistor RL2 is connected in parallel to the inductor L. A capacitor CL is connected in parallel to the resistor RL2.

Also with the configuration described above, by detecting the voltage across the capacitor CL, the inductor current iL can be detected without loss.

Regarding configurations of the embodiments described above, an aspect in which switching of an operating number and the like are performed with reference only to the operating number signal Sop has been described. However, by receiving an instruction signal from a load device to which a switching power supply device is connected and power is supplied and referring to the instruction signal, switching of the operating number and the like may also be performed.

Furthermore, configurations of the embodiments described above can be combined in an appropriate manner, and operational effects corresponding to various combinations can be achieved.

What is claimed is:

1. A system switching power supply device comprising:
    a plurality of power converters, each including an inductor, a switching circuit, and an individual analog controller;
    a common controller configured to output oscillation control signals to the plurality of power converters; and
    a common output terminal that is connected to output parts of the plurality of power converters in parallel and connected to a load,
    wherein
    the individual analog controller includes
        an analog electronic circuit,
        a feedback signal generator configured to detect a state of the output part of the power converter and generate a feedback signal fed back to the power converter, and
        a driver configured to drive a switch of the switching circuit, and
    wherein
    the common controller includes a digital electronic circuit that is configured to perform programmable arithmetic processing, and
    the feedback signal generator includes
        a common node that connects the plurality of power converters in parallel, and
        a common signal generator configured to generate a common bus signal to flow to the common node,
    wherein the driver is configured to drive the switch of the switching circuit based on the feedback signal and one of the oscillation control signals.

2. The system switching power supply device according to claim 1, wherein
    the individual analog controller includes a pulse width modulation control IC, and
    the common controller is configured to generate an oscillation signal by arithmetic processing in which a phase of a switching frequency is able to be set in a programmable manner in association with the number of the plurality of power converters, and output the oscillation signal to the individual analog controller.

3. The system switching power supply device according to claim 2, wherein
    the feedback signal generator includes
        an individual current signal generator configured to generate an individual current signal based on current of the inductor of the power converter, and
        an individual current feedback signal generator configured to generate an individual current feedback signal on the basis of a difference between the individual current signal and the common bus signal and output the individual current feedback signal as the feedback signal, and
    the common signal generator is configured to generate the common bus signal on the basis of the individual current signal for the power converter.

4. The system switching power supply device according to claim 2, further comprising:
    an inductor current detection circuit configured to detect current of the inductor,
    wherein the inductor current detection circuit includes
    a detection capacitor and a detection resistor that configure a CR time constant having a predetermined relationship with a specific inductance and a specific AC resistance at a switching frequency of the inductor, and
    a series circuit, including the detection resistor and the detection capacitor, which is connected in parallel to the inductor, and
    the inductor current detection circuit is configured to generate an output signal on the basis of a voltage across the detection capacitor.

5. The system switching power supply device according to claim 2, wherein
    the common controller is configured to output control signals including oscillation signals in which phases of switching frequencies of the plurality of power converters are shifted from one another.

6. The system switching power supply device according to claim 2, wherein
    the common controller is configured to perform signal processing in accordance with an instruction signal from an outside connected to the common output terminal, and set operations of the individual analog controllers of the plurality of power converters.

7. The system switching power supply device according to claim 2, wherein
    the switching circuit and the individual analog controller are configured as a PWM control IC including FETs that are integrated together.

8. The system switching power supply device according to claim 2, wherein
    the common controller includes a programmable microprocessor.

9. The system switching power supply device according to claim 1, wherein
    the feedback signal generator includes
        an individual current signal generator configured to generate an individual current signal based on current of the inductor of the power converter, and
        an individual current feedback signal generator configured to generate an individual current feedback signal on the basis of a difference between the individual current signal and the common bus signal and output the individual current feedback signal as the feedback signal, and the common signal generator is configured to generate the common bus signal on the basis of the individual current signal for the power converter.

10. The system switching power supply device according to claim 9, wherein
the common signal generator is configured to generate the common bus signal on the basis of a maximum value of the individual current signals for the plurality of power converters.

11. The system switching power supply device according to claim 10, wherein
the feedback signal generator includes an individual voltage feedback signal generator configured to generate an individual voltage feedback signal on the basis of a voltage of the common output terminal, and
the feedback signal generator is configured to feed a signal obtained by adding the individual current feedback signal and the individual voltage feedback signal, as the feedback signal, to the power converter.

12. The system switching power supply device according to claim 10, wherein
the feedback signal generator is configured to output the common bus signal as an operating number signal to the common controller, and
the common controller is configured to set individual operations of the plurality of power converters on the basis of the operating number signal and output the oscillation control signals including the settings for the individual operations.

13. The system switching power supply device according to claim 9, wherein
the common signal generator is configured to generate the common bus signal on the basis of an average value of the individual current signals for the plurality of power converters.

14. The system switching power supply device according to claim 9, wherein
the feedback signal generator includes an individual voltage feedback signal generator configured to generate an individual voltage feedback signal on the basis of a voltage of the common output terminal, and
the feedback signal generator is configured to feed a signal obtained by adding the individual current feedback signal and the individual voltage feedback signal, as the feedback signal, to the power converter.

15. The system switching power supply device according to claim 9, wherein
the feedback signal generator is configured to output the common bus signal as an operating number signal to the common controller, and
the common controller is configured to set individual operations of the plurality of power converters on the basis of the operating number signal and output the oscillation control signals including the settings for the individual operations.

16. The system switching power supply device according to claim 1, further comprising:
an inductor current detection circuit configured to detect current of the inductor,
wherein the inductor current detection circuit includes
a detection capacitor and a detection resistor that configure a CR time constant having a predetermined relationship with a specific inductance and a specific AC resistance at a switching frequency of the inductor, and a series circuit, including the detection resistor and the detection capacitor, which is connected in parallel to the inductor, and
the inductor current detection circuit is configured to generate an output signal on the basis of a voltage across the detection capacitor.

17. The system switching power supply device according to claim 1, wherein
the common controller is configured to output control signals including oscillation signals in which phases of switching frequencies of the plurality of power converters are shifted from one another.

18. The system switching power supply device according to claim 1, wherein
the common controller is configured to perform signal processing in accordance with an instruction signal from an outside connected to the common output terminal, and set operations of the individual analog controllers of the plurality of power converters.

19. The system switching power supply device according to claim 1, wherein
the switching circuit and the individual analog controller are configured as a PWM control IC including FETs that are integrated together.

20. The system switching power supply device according to claim 1, wherein
the common controller includes a programmable microprocessor.

21. A system switching power supply device comprising:
a plurality of power converters, each including an inductor, a switching circuit, and an individual analog controller;
a common controller configured to output oscillation control signals to the plurality of power converters; and
a common output terminal that is connected to output parts of the plurality of power converters in parallel and connected to a load,
wherein
the individual analog controller includes
an analog electronic circuit,
a feedback signal generator configured to detect a state of the output part of the power converter and generate a feedback signal fed back to the power converter, and
a driver configured to drive a switch of the switching circuit, and
wherein
the common controller includes a digital electronic circuit that is configured to perform programmable arithmetic processing, and
the feedback signal generator includes
a common node that connects the plurality of power converters in parallel,
a common signal generator configured to generate a common bus signal to flow to the common node,
an individual current signal generator configured to generate an individual current signal based on current of the inductor of the power converter, and
an individual current feedback signal generator configured to generate an individual current feedback signal on the basis of a difference between the individual current signal and the common bus signal and output the individual current feedback signal as the feedback signal, and the common signal generator is configured to generate the common bus signal on the basis of the individual current signal for the power converter.

\* \* \* \* \*